(12) United States Patent
Zhu et al.

(10) Patent No.: US 10,437,373 B2
(45) Date of Patent: Oct. 8, 2019

(54) DISPLAY SUBSTRATE, DISPLAY PANEL AND DISPLAY DEVICE

(71) Applicant: Xiamen Tianma Micro-Electronics Co., Ltd., Xiamen (CN)

(72) Inventors: Yihua Zhu, Xiamen (CN); Hao Wu, Xiamen (CN); Shoujin Cai, Xaimen (CN); Guozhao Chen, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 35 days.

(21) Appl. No.: 15/875,300

(22) Filed: Jan. 19, 2018

(65) Prior Publication Data

US 2019/0064985 A1    Feb. 28, 2019

(30) Foreign Application Priority Data

Aug. 30, 2017   (CN) .......................... 2017 1 0761085

(51) Int. Cl.
| G06F 3/041 | (2006.01) |
| G02F 1/1333 | (2006.01) |
| G02F 1/1343 | (2006.01) |
| G06F 3/044 | (2006.01) |

(52) U.S. Cl.
CPC .......... *G06F 3/0414* (2013.01); *G02F 1/1343* (2013.01); *G02F 1/13338* (2013.01); *G06F 3/0412* (2013.01); *G06F 3/044* (2013.01); *G06F 2203/04103* (2013.01); *G06F 2203/04105* (2013.01)

(58) Field of Classification Search
CPC ...... G06F 3/0414; G06F 3/0412; G06F 3/044; G06F 2203/04103; G06F 2203/04105; G02F 1/13338; G02F 1/1343
See application file for complete search history.

(56) References Cited

U.S. PATENT DOCUMENTS

| 8,780,062 B2 * | 7/2014 | Hibara .................. G06F 3/0418 345/173 |
| 8,878,438 B2 * | 11/2014 | Salter ...................... F21V 23/04 315/149 |
| 9,360,977 B2 * | 6/2016 | Åberg .................. G06F 3/0488 |

(Continued)

*Primary Examiner* — Stephen G Sherman
(74) *Attorney, Agent, or Firm* — Tarolli, Sundheim, Covell & Tummino LLP

(57) ABSTRACT

The present disclosure provides a display substrate, display panel, and display device. The display substrate includes: a base substrate having a display area and a periphery area surrounding the display area; a plurality of force sensors disposed in the periphery area; and a substrate layer layered upon the base substrate and disposed under a film layer where the plurality of force sensors are located and including a plurality of strip-shaped convex structures; wherein a portion of each of the plurality of force sensors corresponding to each of the plurality of strip-shaped convex structures is convex, and another portion of each of the plurality of force sensors corresponding to a gap between adjacent two of the plurality of strip-shaped convex structures is concave. The present disclosure achieves that abnormal display will not appear on display panel at display area edge or position corresponding to force sensor, thereby improving display effect.

17 Claims, 10 Drawing Sheets

(56) References Cited

U.S. PATENT DOCUMENTS

| | | | |
|---|---|---|---|
| 2010/0026654 A1* | 2/2010 | Suddreth | G06F 3/0414 345/174 |
| 2010/0220065 A1* | 9/2010 | Ma | G06F 3/016 345/173 |
| 2017/0262129 A1* | 9/2017 | Cheng | G06F 3/0412 |

* cited by examiner

DISPLAY SUBSTRATE, DISPLAY PANEL AND DISPLAY DEVICE

CROSS-REFERENCE TO RELATED APPLICATIONS

The present application claims priority to Chinese Patent Application No. 201710761085.9, filed on Aug. 30, 2017, the content of which is incorporated herein by reference in its entirety.

TECHNICAL FIELD

The present disclosure relates to the field of display technology and, in particular, to a display substrate, a display panel and a display device.

BACKGROUND

The display panel having a touch function has been widely used in various display devices such as cellphone, tablet computer, and information inquiry machine in public places, etc. The user can operate the display device by only touching the mark on the display panel with the finger, which eliminates the user's dependence on other input devices (such as keyboard, mouse and the like) and makes the human-machine interaction easier.

In order to better meet the user's requirements, a force sensor for detecting the force magnitude when the user is pressing the display panel is usually provided in a peripheral area of the display panel, so that the display panel can acquire the touch position information and the force magnitude information so as to expand the application range of touch technologies.

The inventor has found that the force sensor generates heat during operation, and the heat will cause an abnormal display on the display panel at the edge of the display area and position corresponding to the force sensor, which influences the display effect of the display panel. For example, when the display panel is a liquid crystal display panel, the heat will cause the neighboring liquid crystal to be ineffective, so that the light cannot be adjusted, resulting in black spots on the display panel at the edge of the display area and position corresponding to the force sensor.

SUMMARY

The present disclosure provides a display substrate, a display panel and a display device, so that an abnormal display will not appear on the display panel at the edge of the display area and position corresponding to the force sensor, and thus the display effect of the display panel can be improved.

In a first aspect, the present disclosure provides a display substrate, including: a base substrate having a display area and a periphery area surrounding the display area; a plurality of force sensors disposed in the periphery area; and a substrate layer layered upon the base substrate and disposed under a film layer where the plurality of force sensors are located and including a plurality of strip-shaped convex structures; wherein a portion of each of the plurality of force sensors corresponding to each of the plurality of strip-shaped convex structures is convex, and another portion of each of the plurality of force sensors corresponding to a gap between adjacent two of the plurality of strip-shaped convex structures is concave.

In a second aspect, the present disclosure provides a display panel including a display substrate, and the display substrate includes: a base substrate having a display area and a periphery area surrounding the display area; a plurality of force sensors disposed in the periphery area; and a substrate layer layered upon the base substrate and disposed under a film layer where the plurality of force sensors are located and including a plurality of strip-shaped convex structures; wherein a portion of each of the plurality of force sensors corresponding to each of the plurality of strip-shaped convex structures is convex, and another portion of each of the plurality of force sensors corresponding to a gap between adjacent two of the plurality of strip-shaped convex structures is concave.

In a third aspect, the present disclosure provides a display device including a display panel, the display panel includes a display substrate, and the display substrate includes: a base substrate having a display area and a periphery area surrounding the display area; a plurality of force sensors disposed in the periphery area; and a substrate layer layered upon the base substrate and disposed under a film layer where the plurality of force sensors are located and including a plurality of strip-shaped convex structures; wherein a portion of each of the plurality of force sensors corresponding to each of the plurality of strip-shaped convex structures is convex, and another portion of each of the plurality of force sensors corresponding to a gap between adjacent two of the plurality of strip-shaped convex structures is concave.

The present disclosure provides a display substrate, a display panel and a display device. The display substrate includes a base substrate including a display area and a periphery area surrounding the display area. A plurality of force sensors is disposed in the periphery area. A substrate layer is disposed under a film layer where the sensor is located. The substrate layer includes a plurality of strip-shaped convex structures, a portion of the force sensor corresponding to the strip-shaped convex structure is convex, and another portion of the force sensor corresponding to a gap between adjacent strip-shaped convex structures is concave, so that the force sensor is presented as a concave-convex structure, when the area of a projection of the force sensor on the base substrate is the same as that of the related art, the surface area of the force sensor is larger, the heat dissipation effect is better, and an abnormal display will not appear on the display panel at the edge of the display area and the position corresponding to the force sensor, and thus the display effect of the display panel is improved.

BRIEF DESCRIPTION OF DRAWINGS

The accompanying drawings are briefly introduced as follows. The drawings are not meant to be limiting; those skilled in the art will be able to see alternative drawings without paying creative effort.

DESCRIPTION OF EMBODIMENTS

The technical solutions in the embodiments of the present disclosure are clearly and completely described in the following with reference to the accompanying drawings in the embodiments of the present disclosure. The described embodiments are merely exemplary embodiments of the present disclosure, which shall not be interpreted as limiting the present disclosure. All other embodiments obtained by those skilled in the art without creative efforts according to the embodiments of the present disclosure are within the scope of the present disclosure.

Figure 1:
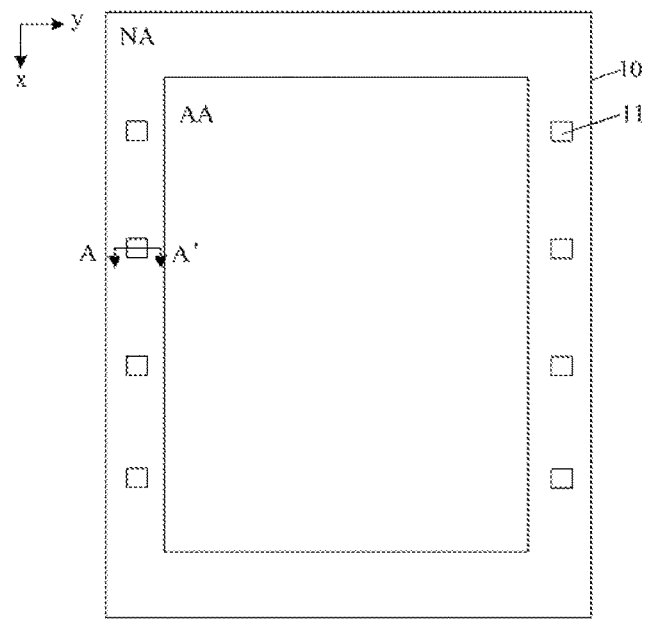
FIG. 1 is top view I of a display substrate provided by an embodiment of the present disclosure.
Figure 2:
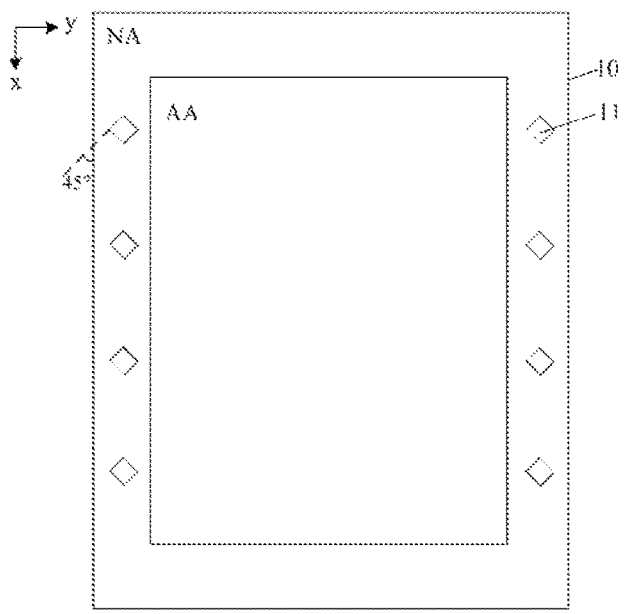
FIG. 2 is top view II of a display substrate provided by an embodiment of the present disclosure.
Figure 3:
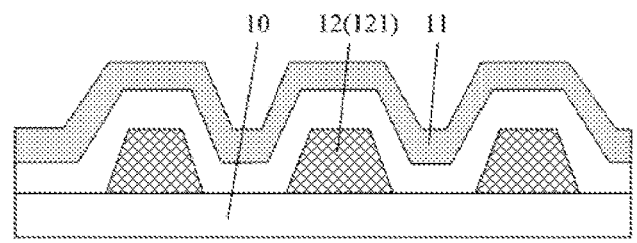
FIG. 3 is schematic cross-sectional view I along AA' direction of FIG. 1 provided by an embodiment of the present disclosure.

The present disclosure provides a display substrate, as shown in FIGS. 1-3, FIG. 1 is top view I of a display substrate provided by an embodiment of the present disclosure, FIG. 2 is top view II of a display substrate provided by an embodiment of the present disclosure, FIG. 3 is schematic cross-sectional view I along AA' direction of FIG. 1 provided by an embodiment of the present disclosure. The display substrate includes: a base substrate 10 including a display area AA and periphery area NA surrounding the display area AA; a plurality of force sensors 11 disposed in the periphery area NA; a substrate layer 12 disposed below a layer where the force sensors 11 are located, the substrate layer 12 including a plurality of strip-shaped convex structures 121; in which a portion of the force sensor 11 corresponding to the strip-shaped convex structure 121 is convex, and another portion of the force sensor 11 corresponding to a gap between adjacent strip-shaped convex structures 121 is concave.

The display substrate in the embodiments has the structure as described above, so that the force sensor 11 has an uneven appearance. When the area of a projection of the force sensor 11 on the base substrate 10 is the same as that of the related art, the surface area of the force sensor 11 is larger, the heat dissipation effect is better, and an abnormal display will not appear on the display panel at the edge of the display area and positions corresponding to the force sensor 11 due to the poor heat dissipation effect of the force sensor 11, the display effect of the display panel is improved. In addition, the better heat dissipation effect of the force sensor 11 can reduce the influence of temperature on the force sensor 11, which is beneficial to keeping a stable performance of the force sensor.

For example, the display panel is a liquid crystal display panel, in this case, since liquid crystal used in the current liquid crystal display panel is usually thermotropic liquid crystal, its liquid crystal phase is presented only within a certain temperature range, if the temperature of the liquid crystal is excessively high, the liquid crystal phase cannot be presented, i.e., the liquid crystal is ineffective, and thus the light cannot be adjusted. In an embodiment, when the force sensor 11 is applied to the liquid crystal display panel, the heat that reaches the liquid crystal neighboring the force sensor 11 can be effectively decreased and thus will not cause the liquid crystal at this portion be ineffective, so that the liquid crystal at this portion can adjust the light normally, and black spots will not appear on the display panel at the edge of the display area and the position corresponding to the force sensor. Of course, when the force sensor 11 is applied to other display panels (such as an organic light-emitting display panel or a micro light-emitting diode display panel), the problem of poor display effect due to the heat generated by the force sensor 11 can also be solved. The above-mentioned poor display effect may be presented in various ways according to different types of the display panel, which can be known by those skilled in the art on basis of the specific structures of various display panels in the related art. When the force sensor 11 is applied to other display panels, those skilled in the art are capable to know the improvement manner with respect to the poor display effect according to the above descriptions with respect to the liquid crystal display panel, which will not be further described herein.

Figure 4:
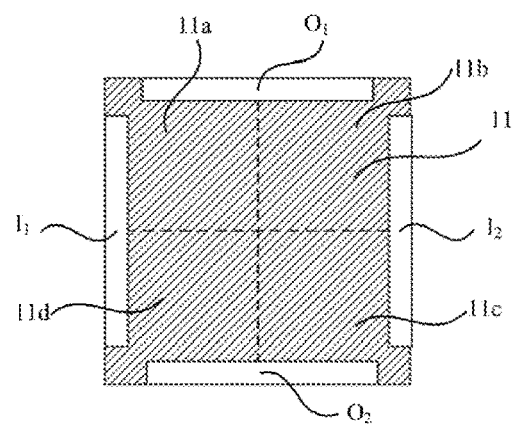
FIG. 4 is schematic view I of a force sensor provided by an embodiment of the present disclosure.

As shown in FIG. 4, FIG. 4 is schematic view I of a force sensor provided by an embodiment of the present disclosure. The force sensor 11 includes a first area 11a, a second area 11b, a third area 11c and a fourth area 11d. The first area 11a is arranged corresponding to the third area 11c, and the second area 11b is arranged corresponding to the fourth area 11d. The force sensor 11 further includes a first signal input end $I_1$, a second signal input end $I_2$, a first signal output end $O_1$ and a second signal output end $O_2$. The first signal input end $I_1$ is opposite to the second signal input end $I_2$, and the first signal output end $O_1$ is opposite to the second signal output end $O_2$. The first area 11a is electrically connected with the first signal input end $I_1$ and the first signal output end $O_1$, the second area 11b is electrically connected with the first signal output end $O_1$ and the second signal input end $I_2$, the third area 11c is electrically connected with the second signal input end $I_2$ and the second signal output end $O_2$, the fourth area 11d is electrically connected with the second signal output end $O_2$ and the first signal input end $I_1$. The first signal input end $I_1$ and the second signal input end $I_2$ are used to input a bias voltage signal to the force sensor 11; the first signal output end $O_1$ and the second signal output end $O_2$ are used to output a force detection signal from the force sensor 11.

When no force is applied to the display panel, the first area 11a, the second area 11b, the third area 11c and the fourth area 11d have the same initial resistance, and a ratio of the resistance of the first area 11a to the resistance of the second area 11b is equal to a ratio of the resistance of the fourth area 11d to the resistance of the third area 11c. The first signal output end $O_1$ and the second signal output end $O_2$ have the same output signal. When a certain force is applied to the display panel and the force sensor 11 detects the certain force, the display panel is deformed under the force and thus the force sensor 11 is deformed, so that the resistances of the first area 11a, the second area 11b, the third area 11c, and the fourth area 11d of the force sensor 11 are changed, respectively. The two ratios mentioned above are changed, so that both the output signal of the first signal output end $O_1$ and the output signal of the second signal output end $O_2$ change, then the magnitude of the force can be obtained by calculation with the output signal value of the first signal output end $O_1$ and the output signal value of the second signal output end $O_2$.

The inventor has found that, during use of the force sensor 11, in some cases, when a force is applied to the display panel (e.g., compression deformation), each of the resistance of the first area 11a, the resistance of the second area 11b, the resistance of the third area 11c, and the resistance of the fourth area 11 of the force sensor 11 increases, so that the ratio of the resistance of the first area 11a to the resistance of the second area 11b and the ratio of the resistance of the fourth area 11d to the resistance of the third area 11c may stay unchanged, and the two ratios are still equal to each other. Although the force sensor 11 is deformed, and each of the resistances of the four areas is changed, the output signal of the first signal output end $O_1$ of the force sensor 11 is still the same as the output signal of the second signal output end $O_2$ of the force sensor 11, which has no difference from the case without applying force, the force sensor 11 cannot detect the magnitude of the force, so that the force sensor 11 has poor reliability and sensitivity.

Figure 5:
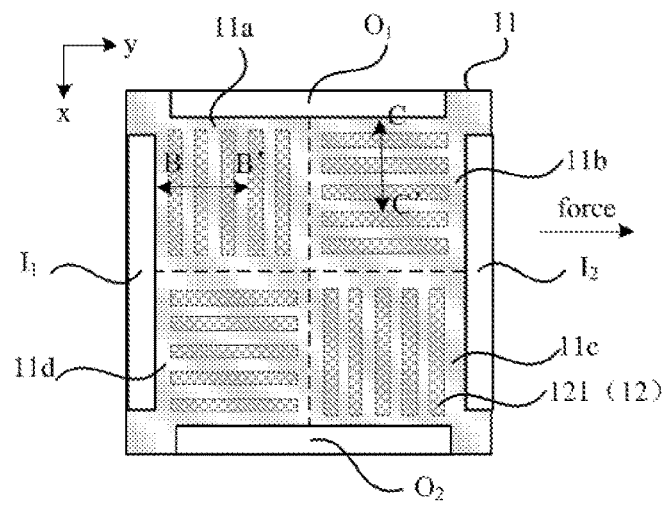
FIG. 5 is enlarged schematic view I of an area where the force sensor is located in FIG. 1 provided by an embodiment of the present disclosure.
Figure 6:
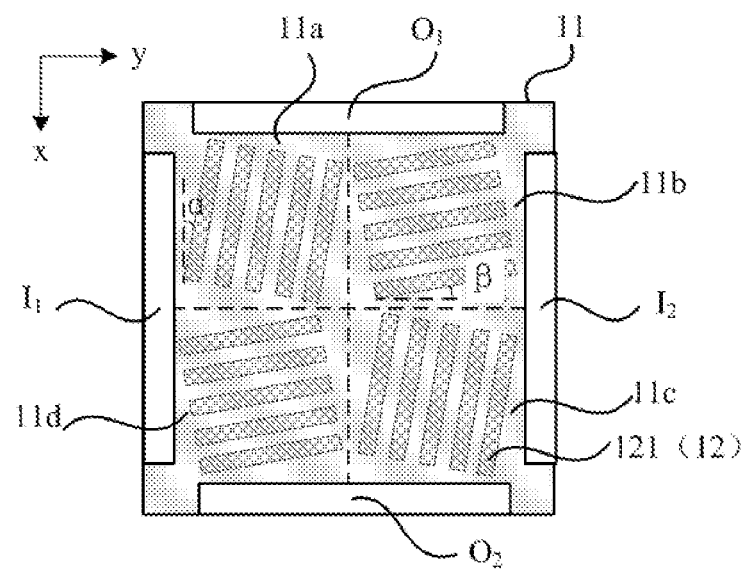
FIG. 6 is enlarged schematic view II of an area where the force sensor is located in FIG. 1 provided by an embodiment of the present disclosure.

In order to solve the above-mentioned technical problems, as shown in FIG. 5 and FIG. 6, FIG. 5 is enlarged schematic view I of an area where the force sensor is located in FIG. 1 provided by an embodiment of the present disclosure, FIG. 6 is enlarged schematic view II of an area where the force sensor is located in FIG. 1 provided by an embodiment of the present disclosure. When the force sensor 11 includes the first area 11a, the second area 11b, the third area 11c, and the fourth area 11d, the first area 11a is arranged corresponding to the third area 11c, and the second area 11b is arranged corresponding to the fourth area 11d, components of the strip-shaped convex structures 121 corresponding to the first area 11a and the third area 11c in a first direction x are greater than components of the strip-shaped convex structures 121 corresponding to the first area 11a and the third area 11c in a second direction y, and components of the strip-shaped convex structures 121 corresponding to the second area 11b and the fourth area 11d in the second direction y are greater than components of the strip-shaped convex structures 121 corresponding to the second area 11b and the fourth area 11d in the first direction. The first direction x is perpendicular to the second direction y.

Figure 7:
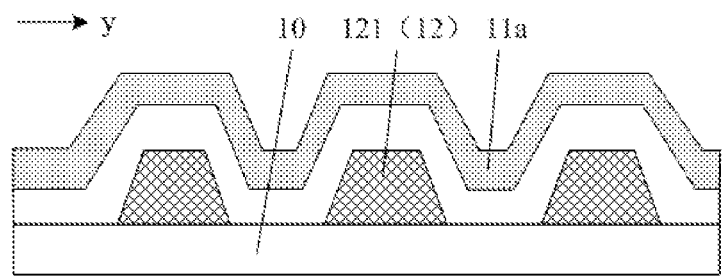
FIG. 7 is a schematic cross-sectional view along BB' direction of FIG. 5 provided by an embodiment of the present disclosure.
Figure 8:
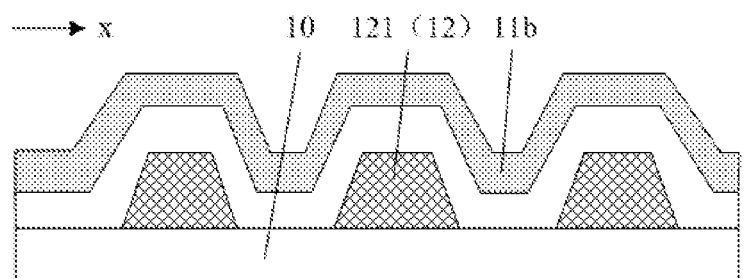
FIG. 8 is a schematic cross-sectional view along CC' direction of FIG. 5 provided by an embodiment of the present disclosure.

As shown in FIG. 7, FIG. 7 is a schematic cross-sectional view along BB' direction of FIG. 5 provided by an embodiment of the present disclosure, since the strip-shaped convex structures 121 have the above-described relation with the corresponding areas, the first area 11a and the third area 11c of the force sensor 11 are presented as a wavy shape in a longitudinal cross-section parallel to the second direction y, consequently, when the first area 11a and the third area 11c of the force sensor 11 are subjected to a force in the second direction y (stretching force or compressing force), a deformation (stretching or compression) of the first area 11a and the third area 11c in the second direction y is not easily caused. On the contrary, the second area 11b and the fourth area 11d of the force sensor 11 are presented as a straight shape in the longitudinal section parallel to the second direction y, consequently, when the second area 11b and the fourth area 11d of the force sensor 11 are subjected to a force in the second direction y, a deformation of the 11b and the fourth area 11d in the second direction y is easily caused. As shown in FIG. 8, FIG. 8 is a schematic cross-sectional view along CC' direction of FIG. 5 provided by an embodiment of the present disclosure. The second area 11b and the fourth area 11d of the force sensor 11 are presented as a wavy shape in a longitudinal section parallel to the first direction x, consequently, when the second area 11b and the fourth area 11d of the force sensor 11 are subjected to a force in the first direction x (stretching force or compressing force), a deformation (stretching or compression) of the second area 11b and the fourth area 11d in the first direction x is not easily caused. On the contrary, the first area 11a and the third area 11c of the force sensor 11 are presented as a straight shape in the longitudinal section parallel to the first direction x, consequently, when the first area 11a and the third area 11c of the force sensor 11 are subjected to a force in the first direction x, a deformation of the first area 11a and the third area 11c in the first direction x is easily caused.

Thus, in the above embodiment, when the force sensor 11 is subjected to a force, a deformation degree of the first area 11a and the third area 11c is different from a deformation degree of the second area 11b and the fourth area 11d, the changes of the resistances are different, making output signals of the two signal output ends of the force sensor 11 are different, so that the force sensor 11 has better reliability and sensitivity.

For example, as shown in FIG. 5, when the force sensor 11 is subjected to a force in the second direction y, the resistances of the second area 11b and the fourth area 11d are increased and the resistances of the first area 11a and the third area 11c has little change due to the function of the strip-shaped convex structure 121 in each area, consequently, the ratio of the resistance of the first area 11a to the resistance of the second area 11b decreases and the ratio of the resistance of the fourth area 11d to the resistance of the third area 11c increases, so that the two ratios are different, making output signals of the two signal output ends of the force sensor 11 are different, so that the force sensor 11 has better reliability and sensitivity.

There is a plurality of implementing manners with respect to the above-mentioned "components of the strip-shaped convex structures 121 corresponding to the first area 11a and the third area 11c in a first direction x are greater than components of the strip-shaped convex structures 121 corresponding to the first area 11a and the third area 11c in a second direction y, and components of the strip-shaped convex structures 121 corresponding to the second area 11b and the fourth area 11d in the second direction y are greater than components of the strip-shaped convex structures 121 corresponding to the second area 11b and the fourth area 11d in the first direction. The first direction x is perpendicular to the second direction y".

In a first implementing manner, as shown in FIG. 5, an extending direction of the strip-shaped convex structure 121 corresponding to the first area 11a and the third area 11c is the first direction x; an extending direction of the strip-shaped convex structure 121 corresponding to the second area 11b and the fourth area 11d is the second direction y. In this case, the strip-shaped convex structure 121 corresponding to the first area 11a and the third area 11c has no component in the second direction y and thus does not obstruct the deformation of the first area 11a and the third area 11c in the first direction x, in addition, the strip-shaped convex structure 121 corresponding to the second area 11b and the fourth area 11d has no component in the first direction x and thus does not obstruct the deformation of the second area 11b and the fourth area 11d in the second direction y.

In a second implementing manner, as shown in FIG. 6, a first included angle α is formed between the strip-shaped convex structure 121 corresponding to the first area 11a and the third area 11c and the first direction x, and the first included angle α is less than 45°; a second included angle β is formed between the strip-shaped convex structure 121 corresponding to the second area 11b and the fourth area 11d and the first direction x, and the second included angle β is less than 45°. In this case, the strip-shaped convex structure 121 corresponding to the first area 11a and the third area 11c is has a component in the second direction y, which is smaller than a component of the strip-shaped convex structure 121 in the first direction x; the strip-shaped convex structure 121 corresponding to the second area 11b and the fourth area 11d has a component in the first direction x, which is smaller than a component of the strip-shaped convex structure 121 in the second direction y.

It should be noted that, the force sensor 11 in the present disclosure may be formed as any structure having a force sensing function. The following description of the present disclosure is given by way of two examples. It should be noted that, in the following two examples, for ease of description, it is taken as an example that the extending direction of the strip-shaped convex structure 121 corresponding to the first area 11a and the third area 11c is the first direction x, and the extending direction of the strip-shaped convex structure 121 corresponding to the second area 11b and the fourth area 11d is the second direction y.

In a first example, as shown in FIG. 4, the force sensor 11 is a silicon-based force sensor and the shape of the force sensor 11 is a rectangle. Two parallel sides of the force sensor are respectively configured as the first signal input end $I_1$ and the second signal input end $I_2$ of the force sensor 11, and the other two parallel sides are respectively configured as the first signal output end $O_1$ and the second signal output end $O_2$ of the force sensor 11. A connection of midpoints of the two parallel sides of the force sensor 11 and a connection of midpoints of the other two parallel sides of the force sensor 11 divide the force sensor 11 into four areas: an area electrically connected with the first signal input end $I_1$ and the first signal output end $O_1$ is the first area 11a, an area electrically connected with the first signal output end $O_1$ and the second signal input end $I_2$ is the second area 11b, the area electrically connected with the second signal input end $I_2$ and the second signal output end $O_2$ is the third area 11c, and the area electrically connected with the second signal output end $O_2$ and the first signal input end $I_1$ is the fourth area 11d.

When the force sensor 11 is a silicon-based force sensor, a material of the force sensor 11 may be polysilicon, the purpose of which is to utilize the conductivity of polysilicon. In order to improve the performance of the force sensor 11, the conductivity of the polysilicon can be correspondingly increased. Therefore, in an embodiment, a material of the force sensor 11 may be heavily doped polysilicon, for example, N-type doped or P-type doped. Optionally, the surface doping concentration is $10^{10}/cm^2$-$10^{15}/cm^2$, and thus the strain resistance of the force sensor 11 will not be excessively great, which is beneficial to transmission and detection of a signal and can effectively protect the lattice structure of the polysilicon from being destroyed.

In an embodiment, the shape of the display substrate may be a rectangle, based on this, there may be a plurality of position relations between a side of the force sensor 11 and a side of the display substrate.

For example, as for a first position relation, as shown in FIG. 1, the side of the force sensor 11 is parallel to the side of the display substrate, the first direction x is an extending direction of two parallel sides of the display substrate, and the second direction y is an extending direction of the other two parallel sides of the display substrate, in this case, as shown in FIG. 5, an extending direction of the strip-shaped convex structure 121 corresponding to the first area 11a and the third area 11c is the same as the extending direction of the two parallel sides of the display substrate, i.e., the first direction x; an extending direction of the strip-shaped convex structure 121 corresponding to the second area 11b and the fourth area 11d is the same as the extending direction of the other two parallel sides of the display substrate, i.e., the second direction y.

Figure 9:
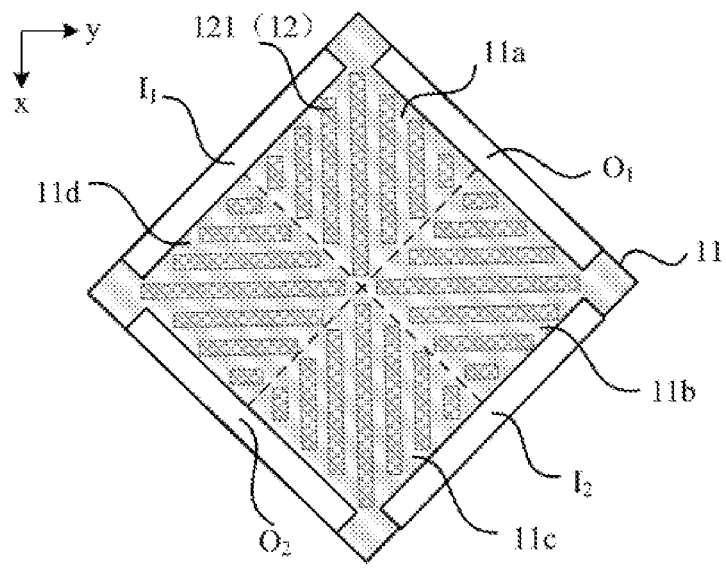
FIG. 9 is enlarged schematic view I of an area where the force sensor is located in FIG. 2 provided by an embodiment of the present disclosure.
Figure 10:
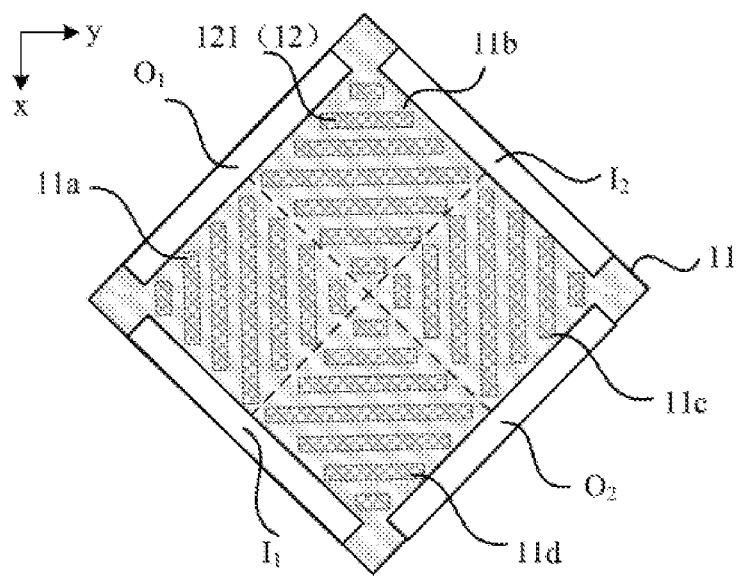
FIG. 10 is enlarged schematic view II of an area where the force sensor is located in FIG. 2 provided by an embodiment of the present disclosure.

As for a second position relation, as shown in FIG. 2, an included angle of 45° is formed between the side of the force sensor 11 and the side of the display substrate, the first direction x is an extending direction of two parallel sides of the display substrate, and the second direction y is an extending direction of the other two parallel sides of the display substrate, i.e., as shown in FIG. 9 and FIG. 10, FIG. 9 is enlarged schematic view I of an area where the force sensor is located in FIG. 2 provided by an embodiment of the present disclosure, FIG. 10 is enlarged schematic view II of an area where the force sensor is located in FIG. 2 provided by an embodiment of the present disclosure. an extending direction of the strip-shaped convex structure 121 corresponding to the first area 11a and the third area 11c is the same as the extending direction of the two parallel sides of the display substrate, both of which are the first direction x; an extending direction of the strip-shaped convex structure 121 corresponding to the second area 11b and the fourth area 11d is the same as the extending direction of the other two parallel sides of the display substrate, both of which are, i.e., the second direction y.

As for the second position relation, there are two implementing manners that the first area 11a is arranged corresponding to the third area 11c, and the second area 11b is arranged corresponding to the fourth area 11d. For example, as shown in FIG. 9, the first area 11a and the third area 11c of the force sensor 11 are diagonally disposed along the first direction x, the second area 11b and the fourth area 11d are diagonally disposed along the second direction y, in this case, the first area 11a and the third area 11c are mainly used for detecting the deformation of the force sensor 11 in the first direction x, the second area 11b and the fourth area 11d are mainly used for detecting the deformation of the force sensor 11 in the second direction y. Or as shown in FIG. 10, the first area 11a and the third area 11c of the force sensor 11 are diagonally disposed along the second direction y, the second area 11b and the fourth area 11d are diagonally disposed along the first direction x, the first area 11a and the third area 11c are mainly used for detecting the deformation of the force sensor 11 in the first direction x, the second area 11b and the fourth area 11d are mainly used for detecting the deformation of the force sensor 11 in the second direction y.

Figure 11:
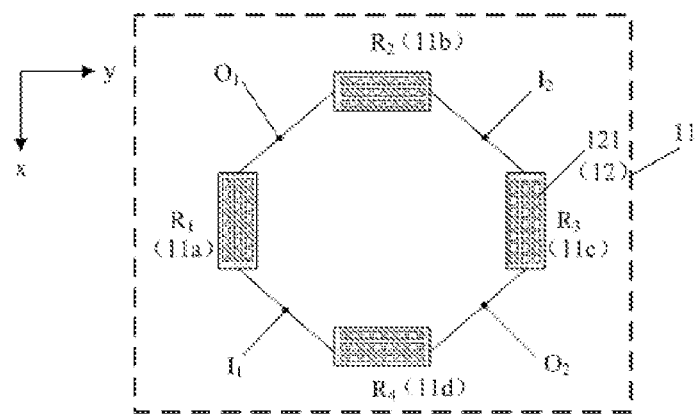
FIG. 11 is schematic view II of a force sensor provided by an embodiment of the present disclosure.
Figure 12:
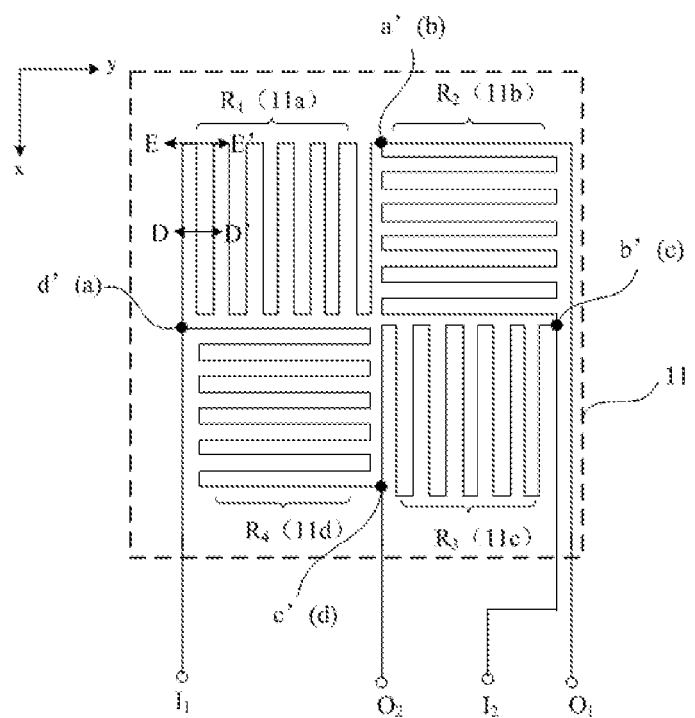
FIG. 12 is schematic view III of a force sensor provided by an embodiment of the present disclosure.

In a second example, as shown in FIG. 11 and FIG. 12, FIG. 11 is schematic view II of a force sensor provided by an embodiment of the present disclosure, FIG. 12 is schematic view III of a force sensor provided by an embodiment of the present disclosure. The force sensor 11 is a bridge force sensor, the force sensor 11 includes a first resistor $R_1$, a second resistor $R_2$, a third resistor $R_3$ and a fourth resistor $R_4$ that are sequentially and electrically connected end-to-end. The first resistor $R_1$, the second resistor $R_2$, the third resistor $R_3$ and the fourth resistor $R_4$ are regarded as the first area 11a, the second area 11b, the third area 11c and the fourth area 11d of the force sensor 11, respectively. A material of the first resistor $R_1$, the second resistor $R_2$, the third resistor $R_3$ and the fourth resistor $R_4$ may be a semiconductor (for example, polysilicon), a metal, a transparent oxide (for example, indium tin oxide), or the like.

As for each force sensor 11, a second end of the first resistor $R_1$ is electrically connected with a first end of the second resistor $R_2$, a second end of the second resistor $R_2$ is electrically connected with a first end of the third resistor $R_3$, a second end of the third resistor $R_3$ is electrically connected with a first end of the fourth resistor $R_4$, a second end of the fourth resistor $R_4$ is electrically connected with a first end of the first resistor $R_1$. A first signal input end $I_1$ is provided between the second end of the first resistor $R_1$ and the first end of the fourth resistor $R_4$, a second signal output end $O_2$ is provided between the second end of the fourth resistor $R_4$ and the first end of the third resistor $R_3$, a second signal input end $I_2$ is provided between the second end of the third resistor $R_3$ and the first end of the second resistor $R_2$, a first signal output end $O_1$ is provided between the second end of the second resistor $R_2$ and the first end of the first resistor $R_1$.

There may have various shapes for each of the first resistor $R_1$, the second resistor $R_2$, the third resistor $R_3$ and the fourth resistor $R_4$.

For example, as shown in FIG. 11, each of the shapes of the first resistor $R_1$, the second resistor $R_2$, the third resistor $R_3$ and the fourth resistor $R_4$ is a rectangle, long sides of the first resistor $R_1$ and the third resistor $R_3$ extend along the first direction x, and long sides of the second resistor $R_2$ and the fourth resistor $R_4$ extend along the second direction y. In this case, by the cooperation of the extending direction (i.e., the first direction x) of each of the first resistor $R_1$ and the third resistor $R_3$ and the extending direction (i.e., the first direction x) of the strip-shaped convex structure 121 corresponding to the first resistor $R_1$ and the third resistor $R_3$, the first resistor $R_1$ and the third resistor $R_3$ sense a strain in the first direction x. Similarly, by the cooperation of the extending direction (i.e., the second direction y) of each of the second resistor $R_2$ and the fourth resistor $R_4$ and the extending direction (i.e., the second direction y) of the strip-shaped convex structure 121 corresponding to the second resistor $R_2$ and the fourth resistor $R_4$, the second resistor $R_2$ and the fourth resistor $R_4$ sense a strain in the second direction y.

As shown in FIG. 12, each of the shapes of the first resistor $R_1$, the second resistor $R_2$, the third resistor $R_3$ and the fourth resistor $R_4$ is snakelike. A component of an extending length of the first resistor $R_1$ from a first end a to a second end a' in the first direction x is greater than a component of the extending length of the first resistor $R_1$ from the first end a to the second end a' in the second direction y, a component of an extending length of the third resistor $R_3$ from a first end c to a second end c' in the first direction x is greater than a component of the extending length of the third resistor $R_3$ from the first end c to the second end c' in the second direction y, a component of an extending length of the second resistor $R_2$ from a first end b to a second end b' in the second direction y is greater than a component of the extending length of the second resistor $R_2$ from the first end b to the second end b' in the first direction x, and a component of an extending length of the fourth resistor $R_4$ from a first end d to a second end d' in the second direction y is greater than a component of the extending length of the fourth resistor $R_4$ from the first end d to the second end d' in the first direction x. With such a structure, the first resistor $R_1$ and the third resistor $R_3$ are capable to sense the strain in the first direction x, the second resistor $R_2$ and the fourth resistor $R_4$ are capable to sense the strain in the second direction y, the area of the entire force sensor is relatively small, and temperature has little influence thereon.

Figure 13:
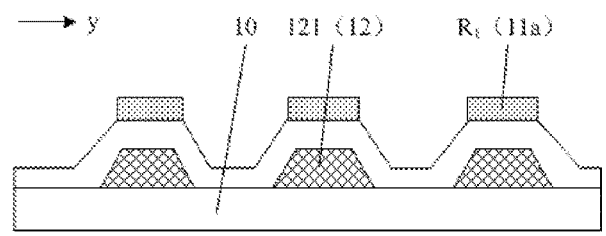
FIG. 13 is schematic cross-sectional view I along DD' direction of FIG. 12 provided by an embodiment of the present disclosure.
Figure 14:
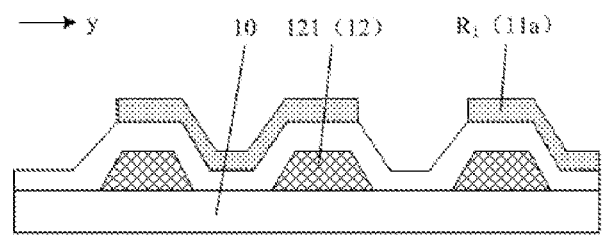
FIG. 14 is schematic cross-sectional view I along EE' direction of FIG. 12 provided by an embodiment of the present disclosure.
Figure 15:
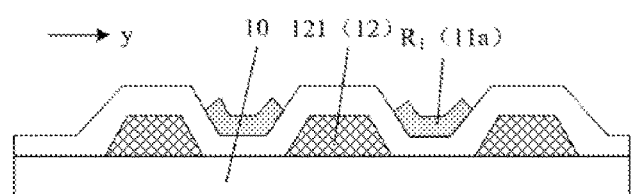
FIG. 15 is schematic cross-sectional view II along DD' direction of FIG. 12 provided by an embodiment of the present disclosure.
Figure 16:
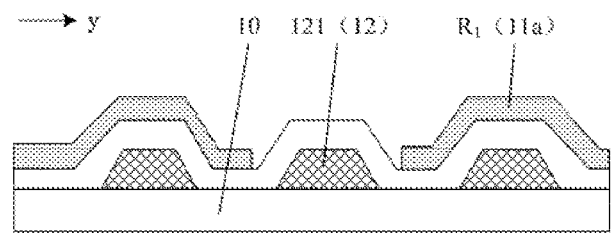
FIG. 16 is schematic cross-sectional view II along EE' direction of FIG. 12 provided by an embodiment of the present disclosure.

Based on this, there may be a plurality of position relations between the strip-shaped convex structure 121 and each resistor. For example, as shown in FIG. 13, FIG. 13 is schematic cross-sectional view I of the first resistor $R_1$ along DD' direction of FIG. 12 provided by an embodiment of the present disclosure. An orthographic projection of the strip-shaped convex structure 121 on the base substrate 10 overlaps with an orthographic projection of the component of the first resistor $R_1$ in the first direction x on the base substrate 10. In this case, as shown in FIG. 14, FIG. 14 is schematic cross-sectional view I of the first resistor $R_1$ along EE' direction of FIG. 12 provided by an embodiment of the present disclosure. In the cross-section parallel to the second direction y, the component of the first resistor $R_1$ in the second direction y is presented as a wavy shape, thereby further increasing the difficulty of deformation of the first resistor $R_1$ in the second direction y, and thus is beneficial for the first resistor $R_1$ to sense the strain in the first direction x. As shown in FIG. 15, FIG. 15 is schematic cross-sectional view II of the first resistor $R_1$ along DD' direction of FIG. 12 provided by an embodiment of the present disclosure. An orthographic projection of the strip-shaped convex structure 121 on the base substrate 10 does not overlap with an orthographic projection of the component of the first resistor $R_1$ in the first direction x on the base substrate 10. In this case, as shown in FIG. 16, FIG. 16 is schematic cross-sectional view II along EE' direction of FIG. 12 provided by an embodiment of the present disclosure. In the cross-section parallel to the second direction y, the component of the first resistor $R_1$ in the second direction y is presented as a wavy shape, thereby further increasing the difficulty of deformation of the first resistor $R_1$ in the second direction y, and thus is beneficial for the first resistor $R_1$ to sense the strain in the first direction x. The position relation between the second resistor $R_2$ and the strip-shaped convex structure 121, the position relation between the third resistor $R_3$ and the strip-shaped convex structure 121, the position relation between the fourth resistor $R_4$ and the strip-shaped convex structure 121 is the same as the position relation between the first resistor $R_1$ and the strip-shaped convex structure 121, which will not be further described herein.

The film layer and structure within the display area AA of the display substrate will be described as follows.

Figure 17:
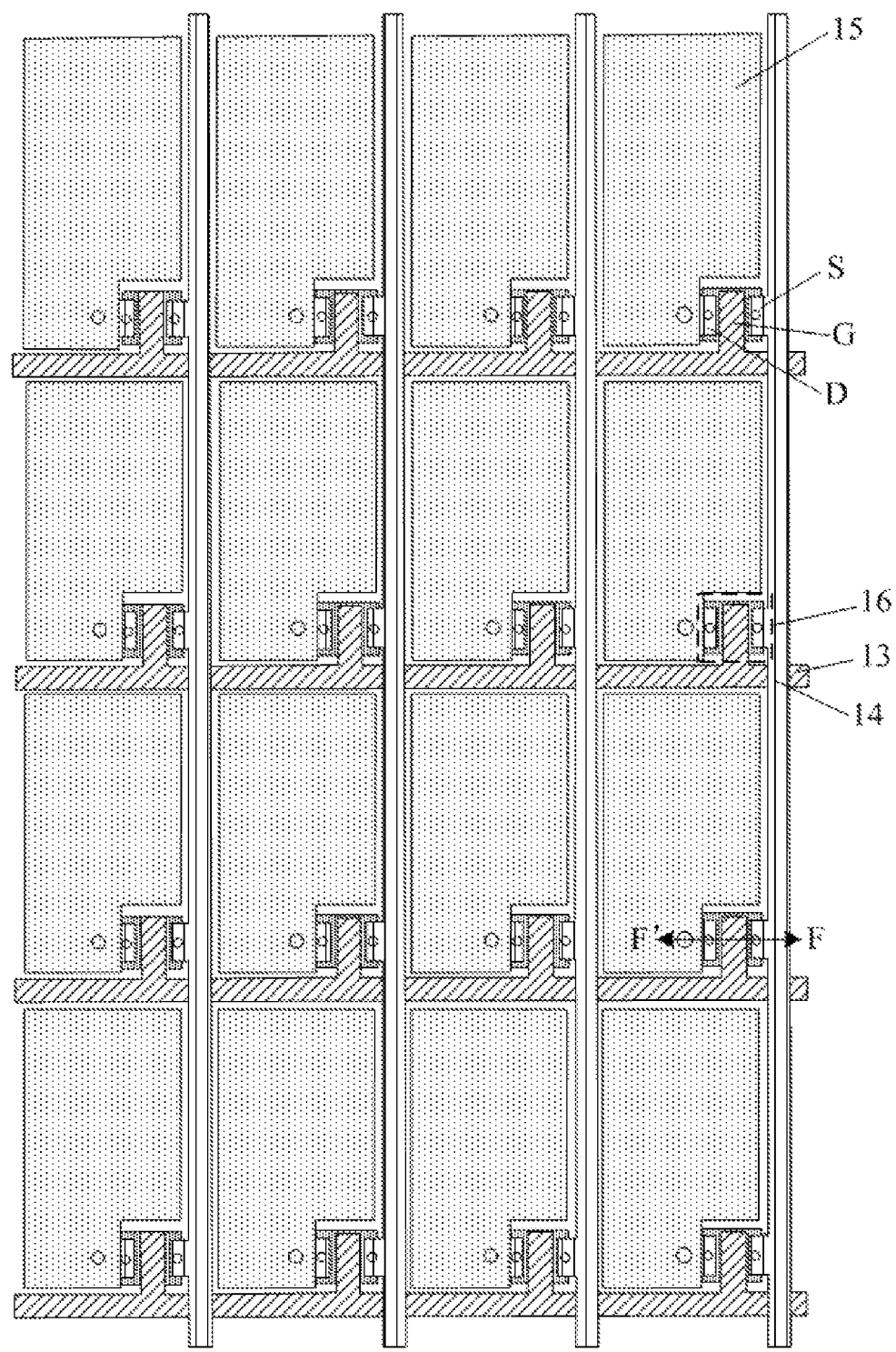
FIG. 17 is top view III of a display substrate provided by an embodiment of the present disclosure.

Optionally, as shown in FIG. 17, FIG. 17 is top view III of a display substrate provided by an embodiment of the present disclosure. A plurality of gate lines 13 and a plurality of data lines 14 are provided in the display area AA of the display substrate and disposed in a crisscross manner, the plurality of gate lines 13 and the plurality of data lines 14 define a plurality of pixel units, and each of the pixel units is provided with a pixel electrode 15 and a thin film transistor 16. A source electrode S of the thin film transistor 16 is electrically connected with the data line 14, a drain electrode D is electrically connected with the pixel electrode 15, and a gate electrode G is electrically connected with the gate line 13.

Figure 18:
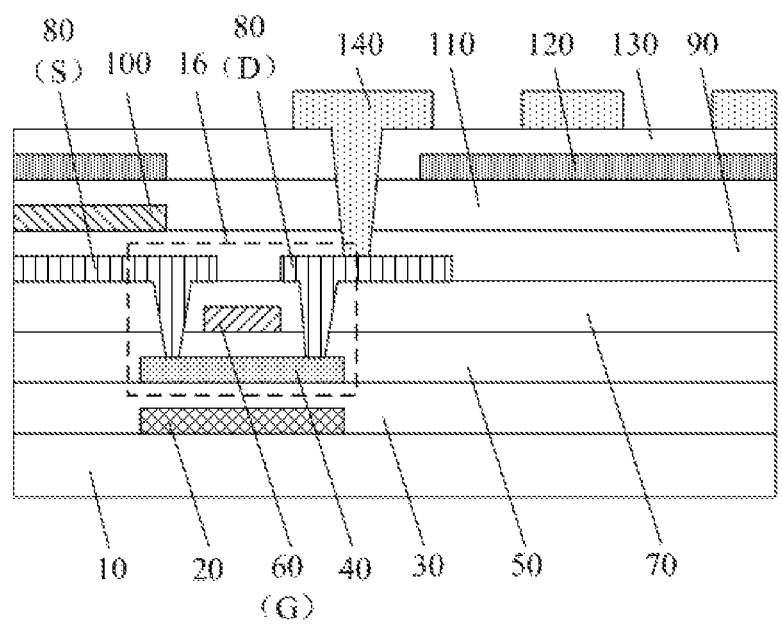
FIG. 18 is a schematic cross-sectional view along FF' direction of FIG. 17 provided by an embodiment of the present disclosure.

As shown in FIG. 18, FIG. 18 is a schematic cross-sectional view along FF' direction of FIG. 17 provided by an embodiment of the present disclosure. In the display area AA of the display substrate, a light shielding layer 20, a buffer layer 30, a polysilicon layer 40, a gate insulation layer 50, a gate metal layer 60, an interlayer insulation layer 70, and a source-drain metal layer 80 are provided sequentially in a direction away from the base substrate 10.

The polysilicon layer 40 includes an active layer of the thin film transistor 16, the gate metal layer 60 includes the gate electrode G of the thin film transistor 16 and the gate line 13, the source-drain electrode metal layer 80 includes the source electrode S of the thin film transistor 16, the drain electrode D of the thin film transistor 16 and the data line 14. The source electrode S and the drain electrode D are respectively connected with the active layer via a through hole penetrating the interlayer insulation layer 70 and the gate insulation layer 50. In order to make a contact resistance between the source electrode S of the thin film transistor 16 and the active layer and a contact resistance between the drain electrode D of the thin film transistor 16 and the active layer to be smaller, an area other than a channel area (region) of the active layer can be heavily doped to form two ohmic contact areas, and the two ohmic contact areas are respectively connected with the source electrode S and the drain electrode D of the thin film transistor 16.

An orthogonal projection of the light shielding layer 20 on the base substrate 10 covers an orthographic projection of the channel area (region) of the active layer on the base substrate 10, so as to shield light emitted from the base substrate 10 toward the active layer, and prevent electric performance of the active layer from being influenced, thereby allowing the thin film transistor 16 to have good electric performance.

A material of the buffer layer 30 may be an insulation material such as silicon oxide, carbon fluoride or the like. The buffer layer 30 can isolate the base substrate 10 (for example, a glass substrate or a substrate with other material) from the active layer, so as to prevent the active layer from being contaminated by directly contacting the base substrate 10 and the light shielding layer 20. In addition, the thin film transistor 16 is disposed on the buffer layer 30, the hole injection efficiency of the thin film transistor 16 can be improved, the driving voltage of each thin film transistor 16 can be decreased, and thus the performance of the thin film transistor 16 can be improved.

Further, as shown in FIG. 18, in the display area AA of the display substrate, a planarization layer 90, a touch lead wire layer 100, a first passivation layer 110, a first transparent conducting layer 120, a second passivation layer 130 and a second transparent conducting layer 140 are provided sequentially in a direction away from the source-drain electrode metal layer 80.

The touch lead wire layer 100 includes a plurality of touch lead wires. The first transparent conducting layer 120 includes a plurality of common electrode blocks, and each common electrode block is electrically connected with its corresponding touch lead wire via a through hole penetrating the first passivation layer 110. The second transparent conducting layer 140 includes a plurality of pixel electrodes 15, and the pixel electrode 15 is electrically connected with the drain electrode D via a through hole penetrating the second passivation layer 130, the first passivation layer 110 and the planarization layer 90.

In an embodiment, the force sensor 11 may be formed simultaneously with the film layer in the display area AA of the display substrate, and the substrate layer 12 may be formed simultaneously with the film layer in the display area AA of the display substrate.

Figure 19:
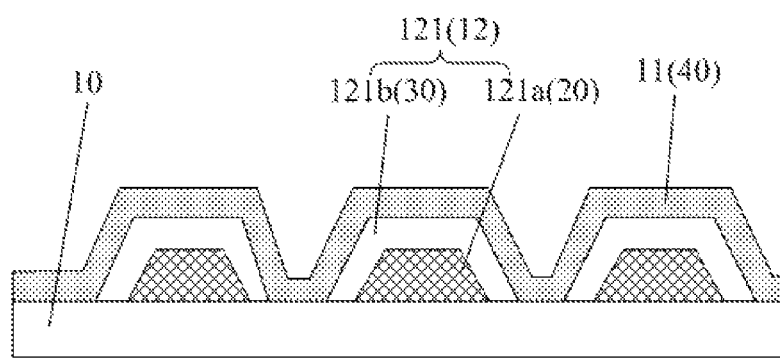
FIG. 19 is schematic cross-sectional view II along AA' direction of FIG. 1 provided by an embodiment of the present disclosure.

For example, the force sensor 11 is a silicon-based force sensor, or the force sensor 11 is a bridge force sensor, when a material of each of the four resistors of the force sensor 11 is a semiconductor, optionally, in a first manner, the force sensor 11 and the polysilicon layer 40 are formed in the same film layer, the substrate layer 12 and the light shielding layer 20 are formed in the same film layer; or in a second manner, the force sensor 11 and the polysilicon layer 40 are formed in the same film layer, the substrate layer 12 and the buffer layer 30 are formed in the same film layer; or in a third manner, as shown in FIG. 19, FIG. 19 is schematic cross-sectional view II along AA' direction of FIG. 1 provided by an embodiment of the present disclosure, the force sensor 11 and the polysilicon layer 40 are formed in the same film layer, in a direction perpendicular to the base substrate 10, each strip-shaped convex structure 121 includes a first portion 121a and a second portion 121b, the first portion 121a and the light shielding layer 20 are formed in the same film layer, the second portion 121b and the buffer layer 30 are formed in the same film layer.

In an embodiment, when the force sensor 11 is a bridge force sensor, when a material of each of the four resistors of the force sensor 11 is a metal, optionally, in a first manner, the force sensor 11 and the gate metal layer 60 are formed in the same film layer, the substrate layer 12 and the light shielding layer 20 are formed in the same film layer; or in a second manner, the force sensor 11 and the source-drain electrode metal layer 80 are formed in the same film layer, the substrate layer 12 and the light shielding layer 20 are formed in the same film layer; or in a third manner, the force sensor 11 and the source-drain electrode metal layer 80 are formed in the same film layer, the substrate layer 12 and the gate metal layer 60 are formed in the same film layer; or in a fourth manner, the force sensor 11 and the source-drain electrode metal layer 80 are formed in the same film layer, in a direction perpendicular to the base substrate 10, the strip-shaped convex structure 121 includes a first portion and a second portion, the first portion and the light shielding layer 20 are formed in the same film layer, the second portion and the gate metal layer 60 are formed in the same film layer.

In an embodiment, when the force sensor 11 is a bridge force sensor, when a material of each of the four resistors of the force sensor 11 is a transparent oxide, optionally, in a first manner, the force sensor 11 and the first transparent conducting layer 120 are formed in the same film layer, the substrate layer 12 and the touch lead wire layer 100 are formed in the same film layer; or, in a second manner, the force sensor 11 and the second transparent conducting layer 140 are formed in the same film layer, the substrate layer 12 and the touch lead wire layer 100 are formed in the same film layer, or, in a third manner, the substrate layer 12 and the first transparent conducting layer 120 are formed in the same film layer.

It should be noted that, when the substrate layer 12 is formed in the same film layer as the light shielding layer 20, the gate metal layer 60, the touch lead wire layer 100, or the first transparent conducting layer 120, there is no need to perform extra patterning processes of the display substrate, which is beneficial to simplifying the manufacturing method of the display substrate and reducing the manufacturing cost. When the substrate layer 12 is formed in a layer directly under the force sensor 11, for example, the force sensor 11 and the polysilicon layer 40 are formed in the same film layer, the substrate layer 12 and the buffer layer 30 are formed in the same film layer, the strip-shaped convex structure 121 in the substrate layer 12 is directly disposed under a layer where the force sensor 11 is located, which has a great influence on the concave-convex structure of the surface of the force sensor 11. When the strip-shaped convex structure 121 includes a first portion and a second portion in the direction perpendicular to the base substrate 10, the height of the strip-shaped convex structure 121 is relatively large, which has a great influence on the concave-convex structure of the surface of the force sensor 11. Those skilled in the art can make choices according to actual requirements.

Figure 20:
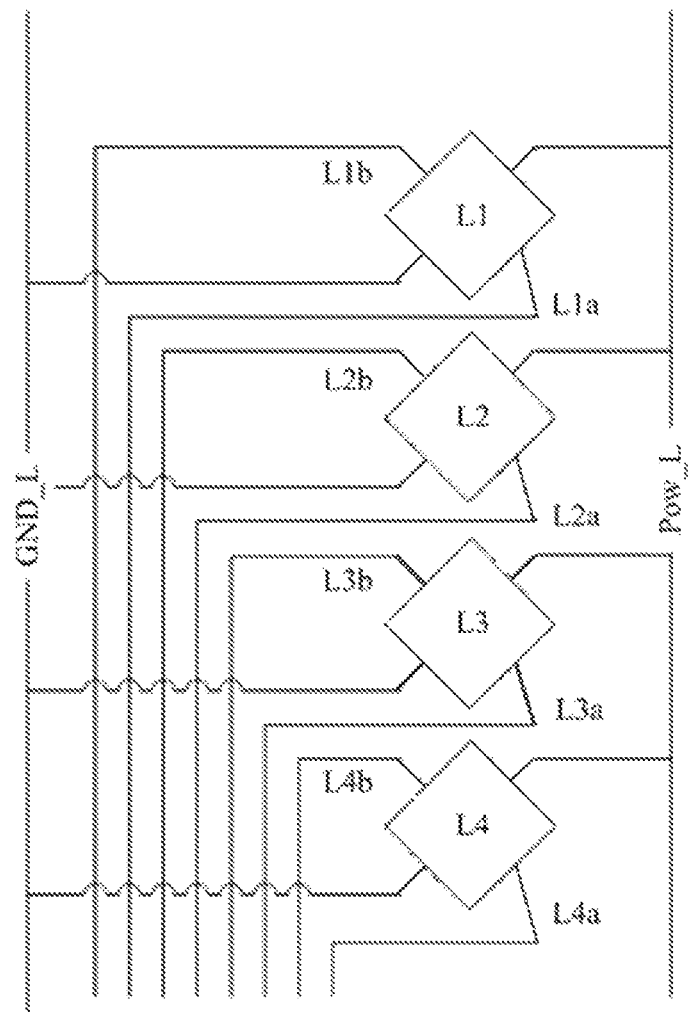
FIG. 20 is a schematic diagram of connection of force sensors provided by an embodiment of the present disclosure.

In addition, optionally, as shown in FIG. 2, four force sensors 11 are uniformly arranged at each of two opposite sides of the of the periphery area NA of the display panel. As shown in FIG. 20, FIG. 20 is a schematic diagram of connection of force sensors provided by an embodiment of the present disclosure. Four force sensors shown in FIG. 20 are respectively represented as L1, L2, L3 and L4. The first signal input ends of the four force sensors 11 are electrically connected with the integration circuit (not shown in FIG. 20) via one wiring (marked as GND_L in FIG. 20), and the second signal input ends of the four force sensors 11 are electrically connected with the integration circuit via one wiring (marked as Pow_L in FIG. 20), each of the signal output ends of the four force sensors 11 (i.e., L1a, L1b, L2a, L2b, L3a, L3b, L4a and L4b in FIG. 20) is electrically connected with the integration circuit via the respective wiring. It should be noted that, in the present disclosure, the number of the force sensors 11 uniformly arranged on two opposite sides of the periphery area NA of the display panel is not limited to four, and it is also possible to be other numbers, such as 3, 5 and so on.

The present disclosure further provides a display panel including the display substrate described above. The display panel may be a liquid crystal display panel, a micro light-emitting diode display panel or an organic light-emitting diode display panel.

Figure 21:
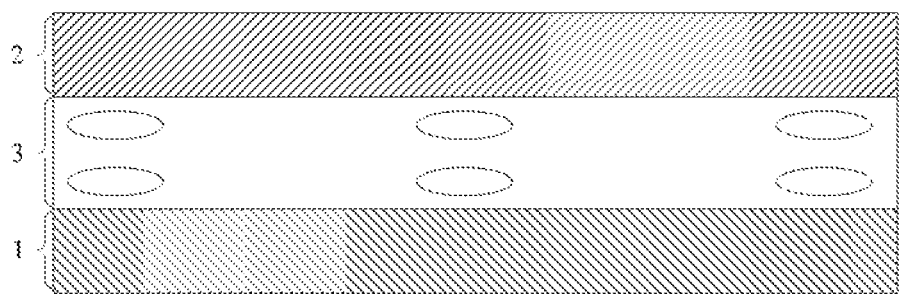
FIG. 21 is a schematic cross-sectional view of a liquid crystal display panel provided by an embodiment of the present disclosure.

For example, the display panel is a liquid crystal display panel, as shown in FIG. 21, FIG. 21 is a schematic cross-sectional view of a liquid crystal display panel provided by an embodiment of the present disclosure. The liquid crystal display panel includes an array substrate 1 and a color film substrate 2 opposite to the array substrate 1. A liquid crystal layer 3 is disposed between the array substrate 1 and the color film substrate 2. The above-mentioned display substrate is the array substrate 1, and the structure thereof can be with reference to the above descriptions, the color film substrate 2 includes a grid-like black matrix and a plurality of color resists arranged in an array within the opening of the black matrix, the color resists include red color resist, green color resist, and blue color resist.

For example, the display panel is an organic light-emitting display panel, the organic light-emitting display panel includes an array substrate, the array substrate includes a plurality of pixel circuits, and the organic light-emitting display panel further includes a plurality of organic light-emitting diodes (Organic Light-Emitting Diode, OLED) disposed on the array substrate, an anode of each organic light-emitting diode is correspondingly electrically connected with the pixel circuit on the array substrate. The plurality of light-emitting diodes includes a light-emitting diode for emitting red light, a light-emitting diode for emitting green light, and a light-emitting diode for emitting blue light. In addition, the organic light-emitting display panel further includes a packaging layer covering the plurality of OLEDs.

For example, the display panel is a micro light-emitting diode display panel, the micro light-emitting diode display panel includes an array substrate, the array substrate includes a plurality of pixel circuits, and the micro light-emitting diode display panel further includes a plurality of micro light-emitting diodes (Micro Light-emitting Diode, Mic-LED), an anode of each Mic-LED is correspondingly electrically connected with the pixel circuit on the array substrate, the plurality of Mic-LEDs include a Mic-LED for emitting red light, a Mic-LED for emitting green light, and a Mic-LED for emitting blue light. The Mic-LED can be formed on a growth substrate and subsequently transferred to the array substrate.

Figure 22:
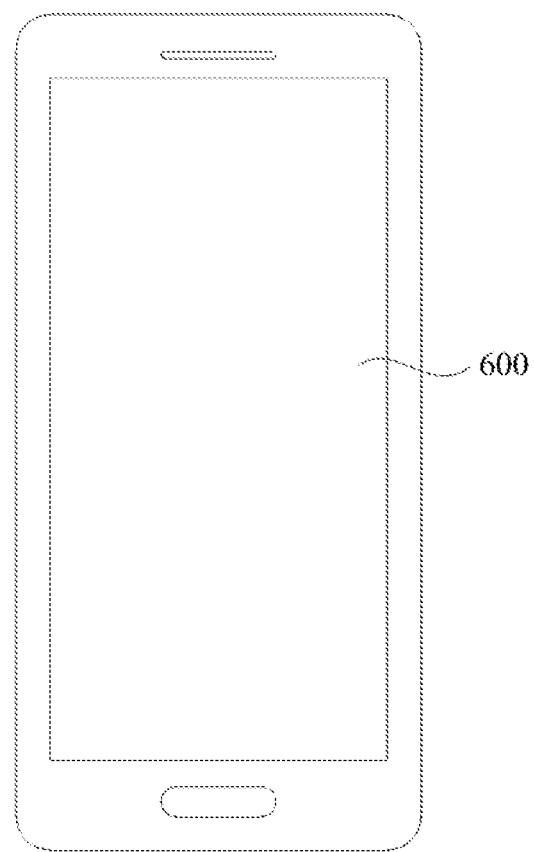
FIG. 22 is a top view of a display device provided by an embodiment of the present disclosure.

In addition, the present disclosure further provides a display device. As shown in FIG. 22, FIG. 22 is a top view of a display device provided by an embodiment of the present disclosure. The display device includes the display panel 600 described above. When the display panel is a liquid crystal display panel, the display device further includes a backlight module disposed at a side of the array substrate of the liquid crystal display panel facing away from the color film substrate, and the backlight module provides light to the display panel. The display device provided in the present disclosure may be any product or component having a display function, such as a smart phone, a wearable smart watch, smart glasses, a tablet computer, a television, a displayer, a laptop, a digital photo frame, a navigator, a car monitor, an e-book and the like.

The present disclosure provides a display substrate, a display panel and a display device. The display substrate includes a base substrate including a display area and a periphery area surrounding the display area. A plurality of force sensors is disposed in the periphery area. A substrate layer is disposed under a film layer where the sensor is located. The substrate layer includes a plurality of strip-shaped convex structures, a portion of the force sensor corresponding to the strip-shaped convex structure is the convex, and a portion of the force sensor corresponding to a gap between adjacent strip-shaped convex structures is the concave, so that the force sensor is presented as a concave-convex structure, when the area of a projection of the force sensor on the base substrate is the same as that of the related art, the surface area of the force sensor is larger, the heat dissipation effect is better, and an abnormal display will not appear on the display panel at the edge of the display area and position corresponding to the force sensor, and thus the display effect of the display panel is improved.

Finally, it should be noted that, the above-described embodiments are merely for illustrating the present disclosure but not intended to provide any limitation. Although the present disclosure has been described in detail with reference to the above-described embodiments, it should be understood by those skilled in the art that, it is still possible to modify the technical solutions described in the above embodiments or to equivalently replace some or all of the technical features therein, but these modifications or replacements do not cause the essence of corresponding technical solutions to depart from the scope of the present disclosure.

What is claimed is:

1. A display substrate, comprising:
a base substrate having a display area and a periphery area surrounding the display area;
a plurality of force sensors disposed in the periphery area; and
a substrate layer layered upon the base substrate and disposed under a film layer where the plurality of force sensors are located and comprising a plurality of strip-shaped convex structures;
wherein a portion of each of the plurality of force sensors corresponding to each of the plurality of strip-shaped convex structures is convex, and another portion of each of the plurality of force sensors corresponding to a gap between adjacent two of the plurality of strip-shaped convex structures is concave,
each of the plurality of force sensors comprises four areas, which are a first area, a second area, a third area and a fourth area, the first area is diagonal to the third area, the second area is diagonal to the fourth area,
the strip-shaped convex structure corresponding to the first area and the third area has a component in a first direction and another component in a second direction, and the component of the strip-shaped convex structure corresponding to the first area and the third area in the first direction is greater than the other component of the strip-shaped convex structure corresponding to the first area and the third area in the second direction; the strip-shaped convex structure corresponding to the second area and the fourth area has a component in the first direction and another component in the second direction, and the component of the strip-shaped convex structure corresponding to the second area and the fourth area in the first direction is smaller than the other component of the strip-shaped convex structure corresponding to the second area and the fourth area in the second direction; wherein the first direction is perpendicular to the second direction.

2. The display substrate according to claim 1, wherein
an extending direction of the strip-shaped convex structure corresponding to the first area and the third area is the first direction; and an extending direction of the strip-shaped convex structure corresponding to the second area and the fourth area is the second direction.

3. The display substrate according to claim 2, wherein
each of the plurality of force sensors is a silicon-based force sensor shaped as a rectangle;
two parallel sides of each of the plurality of force sensors respectively serve as a first signal input end and a second signal input end of the respective force sensor, and the other two parallel sides of the respective force sensor respectively serve as a first signal output end and a second signal output end of the respective force sensor, a connection of midpoints of the two parallel sides of each of the plurality of force sensors and a connection of midpoints of the other two parallel sides of the respective force sensor divide the respective force sensor into four areas;
for the four areas included by each of the plurality of force sensors, the first area is an area electrically connected to the first signal input end and the first signal output end, the second area is an area electrically connected to the first signal output end and the second signal input end, the third area is an area electrically connected to the second signal input end and the second signal output end, and the fourth area is an area electrically connected to the second signal output end and the first signal input end.

4. The display substrate according to claim 3, wherein
a shape of the display substrate is a rectangle, four sides of each of the plurality of force sensors are respectively parallel to four sides of the display substrate; the first direction is a direction parallel to two parallel sides of the display substrate, and the second direction is a direction parallel to the other two parallel sides of the display substrate.

5. The display substrate according to claim 3, wherein a shape of the display substrate is a rectangle, and an included angle of 45° is formed between a side of each of the plurality of force sensors and a side of the display substrate; the first direction is a direction parallel to two parallel sides of the display substrate, and the second direction is a direction parallel to the other two parallel sides of the display substrate.

6. The display substrate according to claim 5, wherein
the first area and the third area of each of the plurality of force sensors are diagonally arranged along the second direction, and the second area and the fourth area of each of the plurality of force sensors are diagonally arranged along the first direction.

7. The display substrate according to claim 5, wherein
the first area and the third area of each of the plurality of force sensors are diagonally arranged along the first direction, and the second area and the fourth area of each of the plurality of force sensors are diagonally arranged along the second direction.

8. The display substrate according to claim 3, wherein
a plurality of gate lines and a plurality of data lines are provided in the display area of the display substrate and disposed in a crisscross manner, and the plurality of gate lines and the plurality of data lines cooperatively define a plurality of pixel units, each of the pixel units is provided with a pixel electrode and a thin film transistor, a source electrode of the thin film transistor is electrically connected to the data line, a drain electrode thereof is electrically connected to the pixel electrode, and a gate electrode thereof is electrically connected to the gate line;
in the display area of the display substrate, a light shielding layer, a buffer layer, a polysilicon layer, a gate insulation layer, a gate metal layer, an interlayer insulation layer, and a source-drain electrode metal layer are provided sequentially in a direction away from the base substrate;
the polysilicon layer comprises an active layer of the thin film transistor, an orthographic projection of the light shielding layer on the base substrate covers an orthographic projection of the active layer on the base substrate, the gate metal layer comprises the gate electrode of the thin film transistor and the gate line, the source-drain electrode metal layer comprises the source electrode, the drain electrode of the thin film transistor and the data line; the source electrode and the drain electrode are connected to the active layer via a through hole penetrating both the interlayer insulation layer and the gate insulation layer;

the plurality of force sensors and the polysilicon layer are formed in the same film layer; the substrate layer and the light shielding layer are formed in the same film layer, or, the substrate layer and buffer layer are formed in the same film layer, or, in a direction perpendicular to the base substrate, the strip-shaped convex structure comprises a first portion and a second portion, the first portion and the light shielding layer are formed in the same film layer, the second portion and the buffer layer are formed in the same film layer.

9. The display substrate according to claim 2, wherein the plurality of force sensors is a bridge force sensor, and each of the plurality of force sensors comprises a first resistor, a second resistor, a third resistor, and a fourth resistor that are sequentially and electrically connected end-to-end; the first resistor, the second resistor, the third resistor and the fourth resistor respectively serve as the first area, the second area, the third area, and the fourth area;

the first resistor, the second resistor, the third resistor and the fourth resistor each have a rectangular shape, long sides of the first resistor and the third resistor extend along the first direction, and long sides of the second resistor and the fourth resistor extend along the second direction.

10. The display substrate according to claim 9, wherein a plurality of gate lines and a plurality of data lines are provided in the display area of the display substrate and disposed in a crisscross manner, and the plurality of gate lines and the plurality of data lines cooperatively define a plurality of pixel units, each of the pixel units is provided with a pixel electrode and a thin film transistor, a source electrode of the thin film transistor is electrically connected to the data line, a drain electrode thereof is electrically connected to the pixel electrode, and a gate electrode thereof is electrically connected to the gate line;

in the display area of the display substrate, a light shielding layer, a buffer layer, a polysilicon layer, a gate insulation layer, a gate metal layer, an interlayer insulation layer, a source-drain electrode metal layer, a planarization layer, a touch lead wire layer, a first passivation layer, a first transparent conducting layer, a second passivation layer and a second transparent conducting layer are provided sequentially in a direction away from the base substrate;

the polysilicon layer comprises an active layer of the thin film transistor, an orthographic projection of the light shielding layer on the base substrate covers an orthographic projection of the active layer on the base substrate, the gate metal layer comprises the gate electrode of the thin film transistor and the gate line, the source-drain electrode metal layer comprises the source electrode, the drain electrode of the thin film transistor and the data line; the source electrode and the drain electrode are connected to the active layer via a through hole penetrating both the interlayer insulation layer and the gate insulation layer; the touch lead wire layer comprises a plurality of touch lead wires, the first transparent conducting layer comprises a plurality of common electrode blocks, each of the common electrode blocks is electrically connected to the touch lead wire via a through hole penetrating the first passivation layer, the second transparent conducting layer comprises a plurality of pixel electrodes, and the pixel electrode is electrically connected to the drain electrode via a through hole penetrating the second passivation layer, the first passivation layer, and the planarization layer.

11. The display substrate according to claim 10, wherein the plurality of force sensors and the polysilicon layer are formed in the same film layer; the substrate layer and the light shielding layer are formed in the same film layer, or, the substrate layer and buffer layer are formed in the same film layer, or, in a direction perpendicular to the base substrate, the strip-shaped convex structure comprises a first portion and a second portion, the first portion and the light shielding layer are formed in the same film layer, the second portion and the buffer layer are formed in the same film layer.

12. The display substrate according to claim 10, wherein the plurality of force sensors and the gate metal layer are formed in the same film layer, the substrate layer and the light shielding layer are formed in the same film layer, or, the plurality of force sensors and the source-drain electrode metal layer are formed in the same film layer, the substrate layer and the light shielding layer are formed in the same film layer, or, the substrate layer and the gate metal layer are formed in the same film layer, or, in a direction perpendicular to the base substrate, the strip-shaped convex structure comprises a first portion and a second portion, the first portion and the light shielding layer are formed in the same film layer, the second portion and the gate metal layer are formed in the same film layer.

13. The display substrate according to claim 10, wherein the plurality of force sensors and the first transparent conducting layer are formed in the same film layer, the substrate layer and the touch lead wire layer are formed in the same film layer; or, the plurality of force sensors and the second transparent conducting layer are formed in the same film layer, the substrate layer and the touch lead wire layer are formed in the same film layer, or, the substrate layer and the first transparent conducting layer are formed in the same film layer.

14. The display substrate according to claim 2, wherein the plurality of force sensors is a bridge force sensor, and each of the plurality of force sensors comprises a first resistor, a second resistor, a third resistor, and a fourth resistor that are sequentially and electrically connected end-to-end; the first resistor, the second resistor, the third resistor and the fourth resistor respectively serve as the first area, the second area, the third area, and the fourth area;

each of the first resistor, the second resistor, the third resistor and the fourth resistor has a snakelike shape, a component of an extending length of the first resistor from a first end to a second end in the first direction is greater than a component of the extending length of the first resistor from the first end to the second end in the second direction, a component of an extending length of the third resistor from a first end to a second end in the first direction is greater than a component of the extending length of the third resistor from the first end to the second end in the second direction, a component of an extending length of the second resistor from a first end to a second end in the second direction is greater than a component of the extending length of the second resistor from the first end to the second end in the first direction, and a component of an extending length of the fourth resistor from a first end to a second end in the second direction is greater than a component of the extending length of the fourth resistor from the first end to the second end in the first direction.

15. The display substrate according to claim 14, wherein a plurality of gate lines and a plurality of data lines are provided in the display area of the display substrate and disposed in a crisscross manner, and the plurality of gate lines and the plurality of data lines cooperatively define a plurality of pixel units, each of the pixel units is provided with a pixel electrode and a thin film transistor, a source electrode of the thin film transistor is electrically connected to the data line, a drain electrode thereof is electrically connected to the pixel electrode, and a gate electrode thereof is electrically connected with the gate line;

in the display area of the display substrate, a light shielding layer, a buffer layer, a polysilicon layer, a gate insulation layer, a gate metal layer, an interlayer insulation layer, a source-drain electrode metal layer, a planarization layer, a touch lead wire layer, a first passivation layer, a first transparent conducting layer, a second passivation layer and a second transparent conducting layer are provided sequentially in a direction away from the base substrate;

the polysilicon layer comprises an active layer of the thin film transistor, an orthographic projection of the light shielding layer on the base substrate covers an orthographic projection of the active layer on the base substrate, the gate metal layer comprises the gate electrode of the thin film transistor and the gate line, the source-drain electrode metal layer comprises the source electrode, the drain electrode of the thin film transistor and the data line; the source electrode and the drain electrode are connected to the active layer via a through hole penetrating both the interlayer insulation layer and the gate insulation layer; the touch lead wire layer comprises a plurality of touch lead wires, the first transparent conducting layer comprises a plurality of common electrode blocks, each of the common electrode blocks is electrically connected to the touch lead wire via a through hole penetrating the first passivation layer, the second transparent conducting layer comprises a plurality of pixel electrodes, and the pixel electrode is electrically connected to the drain electrode via a through hole penetrating the second passivation layer, the first passivation layer, and the planarization layer.

16. A display panel comprising a display substrate, wherein the display substrate comprises:
a base substrate having a display area and a periphery area surrounding the display area;
a plurality of force sensors disposed in the periphery area; and
a substrate layer layered upon the base substrate and disposed under a film layer where the plurality of force sensors are located and comprising a plurality of strip-shaped convex structures;
wherein a portion of each of the plurality of force sensors corresponding to each of the plurality of strip-shaped convex structures is convex, and another portion of each of the plurality of force sensors corresponding to a gap between adjacent two of the plurality of strip-shaped convex structures is concave,
each of the plurality of force sensors comprises four areas, which are a first area, a second area, a third area and a fourth area, the first area is diagonal to the third area, the second area is diagonal to the fourth area,
the strip-shaped convex structure corresponding to the first area and the third area has a component in a first direction and another component in a second direction, and the component of the strip-shaped convex structure corresponding to the first area and the third area in the first direction is greater than the other component of the strip-shaped convex structure corresponding to the first area and the third area in the second direction; the strip-shaped convex structure corresponding to the second area and the fourth area has a component in the first direction and another component in the second direction, and the component of the strip-shaped convex structure corresponding to the second area and the fourth area in the first direction is smaller than the other component of the strip-shaped convex structure corresponding to the second area and the fourth area in the second direction; wherein the first direction is perpendicular to the second direction.

17. A display device comprising a display panel, wherein the display panel comprises a display substrate, and the display substrate comprises:
a base substrate having a display area and a periphery area surrounding the display area;
a plurality of force sensors disposed in the periphery area; and
a substrate layer layered upon the base substrate and disposed under a film layer where the plurality of force sensors are located and comprising a plurality of strip-shaped convex structures;
wherein a portion of each of the plurality of force sensors corresponding to each of the plurality of strip-shaped convex structures is convex, and another portion of each of the plurality of force sensors corresponding to a gap between adjacent two of the plurality of strip-shaped convex structures is concave,
each of the plurality of force sensors comprises four areas, which are a first area, a second area, a third area and a fourth area, the first area is diagonal to the third area, the second area is diagonal to the fourth area,
the strip-shaped convex structure corresponding to the first area and the third area has a component in a first direction and another component in a second direction, and the component of the strip-shaped convex structure corresponding to the first area and the third area in the first direction is greater than the other component of the strip-shaped convex structure corresponding to the first area and the third area in the second direction; the strip-shaped convex structure corresponding to the second area and the fourth area has a component in the first direction and another component in the second direction, and the component of the strip-shaped convex structure corresponding to the second area and the fourth area in the first direction is smaller than the other component of the strip-shaped convex structure corresponding to the second area and the fourth area in the second direction; wherein the first direction is perpendicular to the second direction.

* * * * *